Nov. 21, 1967  NOBUO SUZUKI  3,353,462
EXPOSURE-CONTROL SYSTEM FOR PHOTOGRAPHIC
CAMERAS AND THE LIKE
Filed July 13, 1965  2 Sheets-Sheet 1

Nobuo Suzuki
INVENTOR.

BY

Karl J. Ross
Attorney

United States Patent Office 3,353,462
Patented Nov. 21, 1967

3,353,462
EXPOSURE - CONTROL SYSTEM FOR PHOTO-
GRAPHIC CAMERAS AND THE LIKE
Nabuo Suzuki, 162 Minami-Tsunashima-Kohoku-ku,
Yokohama, Japan
Filed July 13, 1965, Ser. No. 471,684
15 Claims. (Cl. 95—10)

My present invention relates to a camera, for photographic or cinematographic purposes, having means for automatically timing the exposure of a photosensitive surface (e.g. the emulsion of a conventional photographic film) in accordance with prevailing lighting conditions.

The general object of this invention is to provide automatic means in such camera adapted to cut off the illumination of a film, plate or the like after an exposure time varying inversely with the incident luminous flux so that, within predetermined operative limits, correct exposure will always be attained without resort to conventional photometric devices.

A more particular object of this invention is to provide a system of this character which is fully self-contained and responsive only to the flux entering the camera so as not to be influenced by external light sources which do not contribute to the illumination of the sensitive surface.

A camera embodying my invention, equipped with the usual optical objective trained upon the photosensitive surface to be exposed, comprises a diaphragm with an aperture of progressively variable size in line with the objective and, also in line with this objective on either side of the diaphragm, a preferably swingable shutter, normally withdrawn, which is interposed in the path of the light rays and can be rapidly moved into an illumination-blocking position upon being triggered by an electronic switch which responds to the output of a photoelectric device disposed within the camera so as to receive reflected light rays from the illuminated photosensitive surface.

Advantageously, in accordance with another feature of my invention, the diaphragm is of the continuously adjustable iris type so that its aperture is progressively variable from a minimum to a maximum size. In this case, the instantaneous flux increases during the exposure interval, at a rate determined by the intensity of the incident light, until it reaches a magnitude sufficient to trip the shutter release, causing immediate cutoff. It will generally be convenient to utilize the magnitude of the instantaneous flux, as received by the photoelectric device upon reflection at the sensitive surface, as the controlling variable which triggers the shutter release when reaching a predetermined maximum. When establishing the law of motion of the diaphragm-adjusting means, care should be taken in such cases to insure that the instantaneous value remains substantially proportional to the cumulative amount of flux as integrated over the elapsed exposure time; if this condition is satisfied, cutoff will always occur as soon as the total quantity of received luminous radiation has attained its optimum value for which the photoelectric circuit has been preset. The law of motion may, however, be modified if this photoelectric circuit includes an integrating network adapted to store a charge proportional to the output of the associated photocell; in principle, the presence of such an integrating network would allow the system to operate even if the diaphragm aperture were held constant, yet the progressive enlargement of this aperture from a zero or near-zero minimum size greatly increases the available operative light range within a reasonable exposure interval (e.g. up to $\frac{1}{25}$ sec.).

Pursuant to a further feature of my invention, and with the object of insuring optimum resolution in all operative positions of the adjustable diaphragm, I prefer to construct the latter with a substantially rhombic aperture having an obtuse angle of about 104° at opposite corners, these corners being defined by two confrontingly recessed and overlappingly disposed members which are movable in opposite directions along the shorter diagonal of the rhombus.

Although the invention is primarily contemplated for optical systems using visible light rays, it will be apparent that the principles herein disclosed are equally applicable to radiation in the infrared or the ultraviolet band.

The invention will be described hereinafter in greater detail, reference being made to the accompanying drawing in which.

Figure 1:
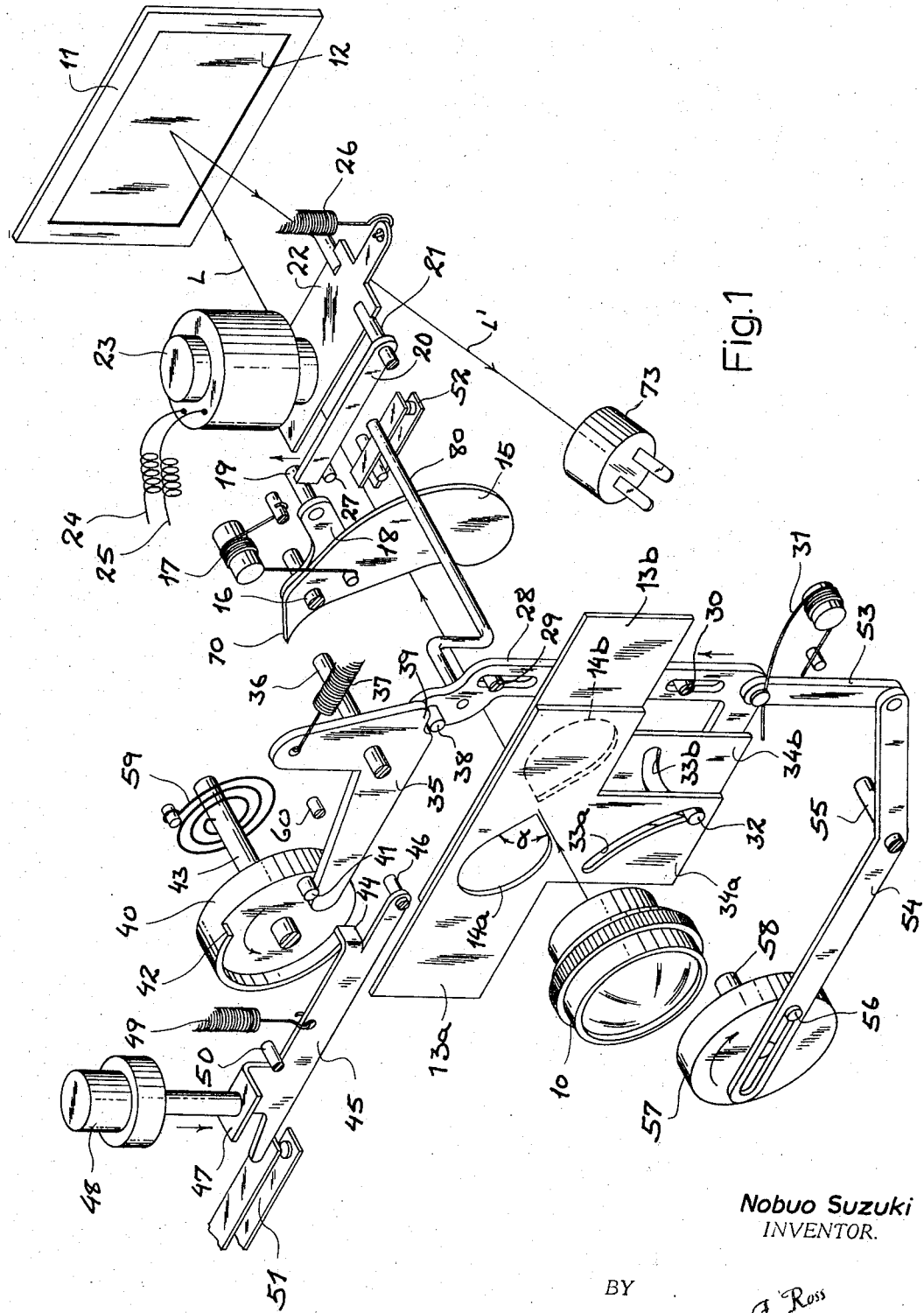
FIG. 1 is a somewhat diagrammatic representation of the interior of a camera housing showing, in perspective view, the elements of an exposure-control system embodying my invention.

The assembly illustrated in FIG. 1 is mounted inside a housing, not shown, of a camera equipped with a photographic objective 10 of conventional design and with means including a frame 11 for exposing the emulsion side of a photographic film 12 to light rays L from an external object projected upon it by the objective 10. The path of the light rays L is normally blocked by a diaphragm constituted by a pair of overlapping slides 13a, 13b having cutouts 14a, 14b which, upon concurrent displacement of the two slides in opposite directions, progressively register with each other to form an aperture of increasing area. Beyond the diaphragm 13a, 13b, and normally swung out of the path of the rays L, is a shutter blade 15 pivotable about a fixed pin 16 and urged by a spring 17 into an illumination-blocking position in the path of the light rays. A bracket 18, rigid with shutter blade 15, carries a pin 19 which normally bears upon a lever 20 keyed to a shaft 21, this shaft also having keyed to it an armature 22 of an electromagnet 23 with input leads 24, 25. A spring 26 tends to hold the lever 20 against a fixed stop 27 in the de-energized condition of magnet 23.

The movement of diaphragm slides 13a, 13b is controlled by an actuating arm 28 mounted with limited vertical mobility on a pair of studs 29, 30. A spring 31 tends to raise the arm 28 from its normal bottom position in which a pin 32 on the lower end of the arm, traversing a pair of overlapping camming slots 33a, 33b in extensions 34a, 34b of slides 13a, 13b, is at the bottom end of these slots whereby the slides 13a, 13b are maintained in their illustrated position of zero aperture. A detent lever 35, pivoted on a fixed pin 36 and urged clockwise by a spring 37, has a shoulder 39 which normally overlies a pin 38 projecting from the upper end of arm 28, thereby preventing the rise of this arm. One end of lever 35, i.e. the one opposite that to which spring 37 is anchored, bears upon a stud 41 of a disk 40 which is journaled on a shaft 43 and has a ridge 42 in contact with a projection 44 of a lever 45, the latter having a fixed fulcrum at 46 and a free end 47 adapted to be depressed by a pushbutton 48 which projects outside the camera housing. This tripping of a lever 45, against the force of a restoring spring 49 tending to hold it engaged with a fixed stop 50, also causes closure of a switch 51 whose contacts are shown positioned in line with the lever extremity 47. Another switch 52, normally closed, is positioned in the path of bracket 18 so as to be opened by the pin 19 thereof when the shutter blade 15 is swung into its blocking position under the urging of spring 17 upon a withdrawal of release lever 20 by magnet 23.

Operating arm 28 is coupled via a link 53 with one end of a lever 54 which is swingable about a fixed fulcrum 55 and has its slotted other end in engagement with a stud 56 on a flywheel 57 journaled on a shaft 58. The flywheel 57 acts as an inertance which moves jointly with arm 28, but at a faster rate owing to the interposition of motion-amplification lever 54, so as to help absorb the stored mechanical energy of spring 31 in a manner designed to linearize the movement of arm 28, i.e. to let it rise at a substantially constant rate as soon as the detent lever 35 has been released by the disk 40. This disk operates to delay the tripping of the diaphragm-adjusting means 28, 34a, 34b for an instant after the contacts 51 have been closed by the pushbutton 48, shaft 43 of the disk being biased in a counterclockwise direction by a spiral spring 59 which comes into play as soon as the extension 44 disengages the ridge 42. It should be noted that the torque exerted by the spring 37 upon the lever 35 is greater than that exerted thereon by the spring 31 via lever 28 and shoulder 39 and that the lever 35, upon its release, comes to rest against a fixed stop 60 in a position in which it no longer interferes with the rise of arm 28 but intercepts the ridge 42 of disk 40 after the latter has carried out only a partial revolution.

Figure 2:
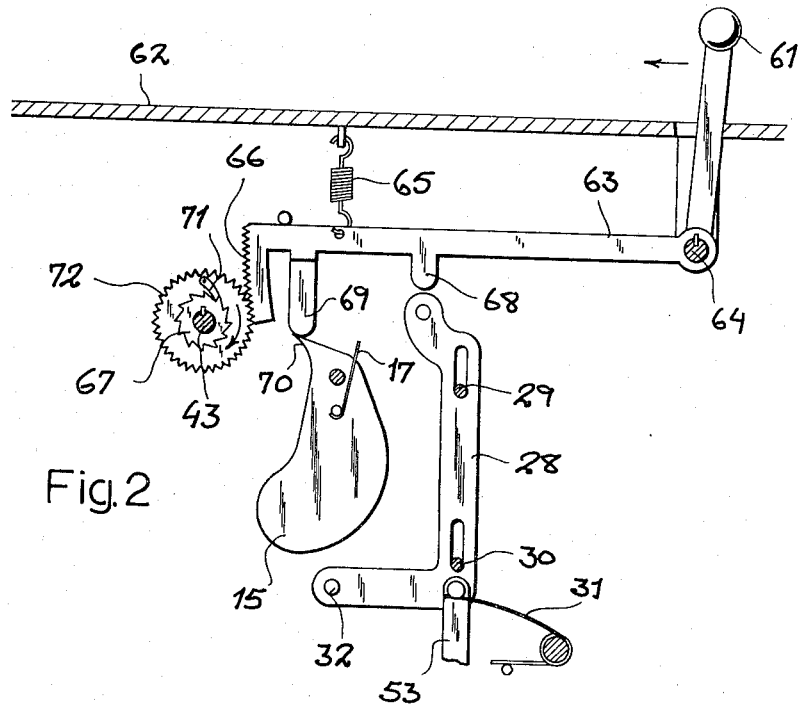
FIG. 2 is a fragmentary sectional view illustrating the means for resetting the mechanism of FIG. 1.

As illustrated in FIG. 2, the system of FIG. 1 may be reset by a crank 61 outside the camera housing which, in this figure, has been partly indicated at 62. Crank 61 has a shaft 64 rigid with a lever 63, which is biased upwardly by a spring 65, and terminates in a toothed segment 66 adapted to engage a pinion 67 mounted idle on the shaft 43 of disk 40. A lug 68 on lever 63 overlies the top of arm 28 so as to drive the latter downwardly, against the force of spring 31, when the crank 61 is actuated; another lug 69 on lever 63, disposed rearwardly of lug 68, at the same time descends onto a projection 70 of blade 15 so that the latter is swung back (counterclockwise in FIG. 2) into its initial position in which its pin 19 is engaged by the lever 20 (magnet 23 being de-energized). Pinion 72 carries a pawl 71 coacting with a ratchet 67 which is keyed to the shaft 43 so as to transmit only clockwise rotation of the pinion to the disk 40. The diameter of pinion 72 is so chosen that, upon a counterclockwise swing of crank 61 and lever 63, arm 28 reaches its lowermost position and clears the shoulder 39 of lever 35 before the disk 40 completes its return movement at the end of which the stud 41 restores the lever 35 to normal.

Figure 3:
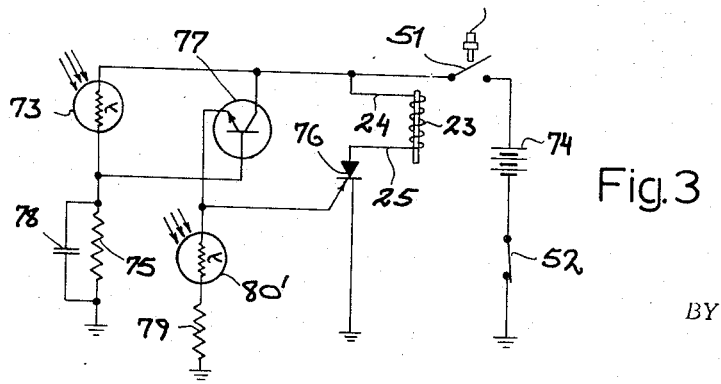
FIG. 3 is a circuit diagram showing the electrical interconnection of various components of the system of FIG. 1.

A photocell 73 is so positioned (FIG. 1) as to intercept light rays L′ reflected from the photosensitive surface of film 12. As shown in FIG. 3, photocell 73 is energizable from a source of direct current, represented by a battery 74 with grounded negative terminal, in series with a grounded resistor 75, the circuit being completed in the closed normal position of switch 52 upon closure of switch 51 via pushbutton 48 and extremity of lever 45. This operation also prepares an energizing circuit, including conductors 24 and 25, for electromagnet 23 which is connected in series with a controlled rectifier 76. The gate of this rectifier is tied to the emitter of an NPN transistor 77 whose collector is connected to the positive battery terminal by way of switch 51 and is returned via photocell 73 to the transistor base at the junction of resistor 75 with that cell. A condenser 78 is shown connected across resistor 75 so as to form with it an integrating network; this condenser may, however, be omitted as will be explained hereinafter. A high-ohmic resistor 79, in series with another photoconductive cell 80′ whose function will be described hereinafter, returns the gate of controlled rectifier 76 to ground to which its cathode is also connected. For the present it will be convenient to assume that cell 80′ is under constant illumination so as to have a fixed resistance supplementing that of resistor 79.

Upon closure of switch 51, and with little or no illumination of photocell 73, the base of transistor 77 will be at a relatively negative potential so that the transistor is cut off and controlled rectifier 76 remains blocked, thereby preventing the flow of current through magnet 23. When, however, the conductivity of the photocell reaches a predetermined level, conduction starts and the gate of the controlled rectifier 76 is driven positive so that magnet 23 operates and attracts its armature 22. The resulting clockwise swing of shaft 21 and lever 20 releases the bracket 18 of shutter 15 and, in addition to allowing this shutter to be swung clockwise by its biasing spring 17, opens the switch 52 so that photocell 73, transistor 77 and magnet 23 are de-energized even though, following release of pushbutton 48, switch 51 is still held closed by engagement of the ridge 42 with the projection 44 of lever 45. A further actuation of pushbutton 48 at this time will therefore be ineffectual.

In operation, with the escapement 35, 40 for the exposure-controlling mechanism of FIG. 1 properly cocked by a reciprocating swing of the resetting crank 61, the objective 10 of the camera is trained upon an object to be photographed whereupon pushbutton 48 is depressed to initiate the exposure. Switch 51 closes to prepare the operating circuit of photocell 73 and magnet 23, and disk 40 spins counterclockwise to withdraw the stud 41 from lever 35 which is now free to move clockwise, under the urging of spring 37, so that its shoulder 39 is withdrawn from engagement with arm 28 which therefore begins to rise at a substantially constant rate in response to the action of spring 31 as balanced by the inertia of flywheel 57. Pin 32, rising with arm 28, cams the slides 13a, 13b toward each other so that their cutouts 14a, 14b begin to register, the area of overlap of these cutouts increasing progressively with a corresponding increase in the luminous flux L′ reflected by film 12 toward photocell 73. As soon as this photocell has become sufficiently conductive to turn on the transistor 77, magnet 23 attracts its armature 22 and releases the shutter 15 which swings across the path of the incident light rays L. The slides 13a and 13b continue their relative movement until the pin 32 has reached the upper end of slots 33a and 33b in a position of full coincidence of their cutouts, yet this operation is without significance since the shutter 15 continues to block the illumination of sensitive surface 12. Thereafter, the user may at any time operate the crank 68 to reset the system preparatorily to a new exposure.

Arm 28 may have secured to it, as shown, a rod 80 adapted to release the shutter by raising the lever 20 upon reaching its highest position before the photocell has energized the magnet 23; this will terminate the exposure even if the incident light is insufficient to trigger the circuit of FIG. 3 within the maximum operating period, e.g., of $\frac{1}{25}$ sec., for which the camming mechanism 28, 32, 34a, 34b is designed. Naturally, the film 12 will be only imperfectly exposed under such circumstances.

If the integrating network 75, 78 had an infinite time constant (i.e., if the resistor 75 were removed), the charge on condenser 78 would truly represent the integrated value of the current passed by the photocell 73 from the moment of circuit closure, this current being substantially proportional to the reflected flux L′ if the photocell 73 has a reasonably linear characteristic. Conversely, if condenser 78 were omitted, the base voltage of transistor 77 would be strictly proportional to the photocell current and, therefore, to the instantaneous magnitude of the flux. Without the condenser 78, therefore, the diaphragm 13a, 13b and its actuating mechanism should be so designed that its effective aperture increases at an exponential rate so that the integrated value of the flux is always constant when the instantaneous flux reaches a predetermined maximum; with condenser 78 present, the operation of the diaphragm may be modified to bring about the same result of an exponential rise of the base voltage of transistor 77.

Figures 4, 5:
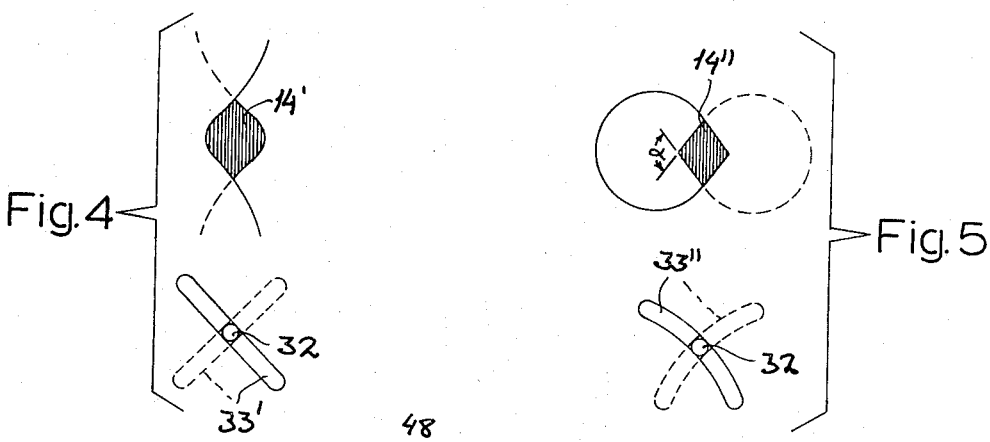
FIGS. 4 and 5 are diagrams serving to explain certain principles in the operation of the system of FIG. 1.

FIG. 4 shows a diaphragm aperture 14′ bounded by substantially logarithmic curves, in association with a pair of rectilinear camming slots 33′. If the pin 32 at the intersection of these slots travels upwardly at constant speed, the area (shaded) of the diaphragm aperture increases at an exponential rate, thus yielding the desired exponential output without condenser 78. The configuration of the diaphragm edges, however, is not very favorable as far as the resolution of the projected image is concerned, owing to the fact that these edges rapidly deviate from the optical axis of the objective.

A more advantageous arrangement, likewise suitable for use without an integrating condenser, is illustrated in FIG. 5 which shows a substantially rhombic diaphragm aperture 14″ bounded by straight edges which include an obtuse angle α; the associated camming slots 33″ are curved so as to bring about a progressively accelerated displacement of the diaphragm slides when the pin 32 rises at a constant rate. It will be noted that the arrangement of FIG. 5 corresponds to substantially that shown in FIG. 1; the angle α has been found to have an optimum at 104°. The distal edges of cutouts 14a, 14b (FIG. 1) are shown to be substantially circularly curved so that the diaphragm aperture approaches an optimum circular shape as the slides 13a, 13b reach their extreme operating position of maximum overlap.

If, as assumed above, the incident flux $\varphi$ is to vary at an exponential rate, its initial value $\varphi_0$ (at starting time $t=0$) must be of finite magnitude so that the relationship $$\varphi = \varphi_0 e^t \qquad (1)$$

can be satisfied; thus, exposure time is measured from an instant shortly after the diaphragm members 13a, 13b have moved out of their illumination-blocking position. The total flux F, from start to cutoff, is then given by $$F = \int_{t=0}^{T} \varphi\, dt = \varphi_0 \int_{t=0}^{T} e^t dt = \varphi_0 (e^T - 1) \qquad (2)$$

where T is the time at cutoff. If exposure is terminated whenever $\varphi$ reaches a predetermined maximum value $\Phi = \varphi_0 e^T$, then $$F = \Phi - \varphi_0 \qquad (3)$$

so that the total flux F approaches a constant value only in a range in which $\varphi_0$ is negligible compared with $\Phi$.

According to a further feature of my invention, the timing of the exposure is further improved by triggering the shutter at an instant T when the right-hand term of Equation 3, rather than just the flux $\varphi$, reaches a predetermined limit. To this end, the photocell 80 of FIG. 3 is subjected at least throughout the exposure to light rays L″ of an intensity proportional to the initial flux $\varphi_0$, thus either directly to ambient light outside the camera housing or to rays branched off the beam L within the housing ahead of the diaphragm 13a, 13b. Since the reflected beam L′, proportional to the incident flux $\varphi$, and the reference beam L″, proportional to the starting flux $\varphi_0$, differently affect the input voltage of transistor 77, the trigger circuit can be designed to respond whenever $\varphi$ reaches a maximum value $\Phi$ satisfying the relationship (3), with F constant, thereby extending the effective range of the system.

I claim:

1. In a camera having an optical objective for projecting light from an external object onto a photosensitive surface, the combination therewith of light-control means in line with said objective for normally blocking illumination of said photosensitive surface; photosensitive means disposed to receive reflected light rays from said photosensitive surface in an unblocking position of said light-control means; trigger means operable to move said light-control means into said unblocking position whereby a radiant flux is directed by said objective onto said photosensitive surface; circuit means connected to said photoelectric means for producing a progressively increasing electric output in response to said flux; operating means for rapidly restoring said light-control means to a blocking position; and electronic switch means connected to said circuit means for tripping said operating means in response to a predetermined magnitude of said electric output whereby said flux is substantially instantaneously cut off.

2. The combination defined in claim 1 wherein said light-control means comprises an adjustable diaphragm and a shutter operable independently of said diaphragm.

3. In a camera having an optical objective for projecting light from an external object onto a photosensitive surface, the combination therewith of continuously adjustable diaphragm means in line with said objective provided with an iris aperture of progressively variable size; normally inoperative mechanism for adjusting said diaphragm means with gradual enlargement of said iris aperture from a minimum to a maximum size; photoelectric means disposed to receive reflected light rays from said photosensitive surface; normally withdrawn shutter means interposable between said objective and said photosensitive surface for blocking illumination of said photosensitive surface; trigger means operable to actuate said mechanism whereby a progressively increasing radiant flux is directed by said objective through said iris aperture onto said photosensitive surface; circuit means connected to said photoelectric means for producing an electric output dependent upon said flux; operating means for rapidly moving said shutter means from a withdrawn position to an illumination-blocking position; and electronic switch means connected to said circuit means for tripping said operating means in response to a predetermined magnitude of said electric output whereby said flux is substantially instantaneously cut off.

4. In a camera having an optical objective for projecting light from an external object onto a photosensitive surface, the combination therewith of continuously adjustable diaphragm means in line with said objective provided with an iris aperture of progressively variable size; normally inoperative mechanism for adjusting said diaphragm means with gradual enlargement of said iris aperture from a minimum to a maximum size, said mechanism including an actuating element and drive means for moving said element at a substantially constant speed; photoelectric means disposed to receive reflected light rays from said photosensitive surface; normally withdrawn shutter means interposable between said objective and said photosensitive surface for blocking illumination of said photosensitive surface; trigger means operable to actuate said mechanism whereby a progressively increasing radiant flux is directed by said objective through said iris aperture onto said photosensitive surface; circuit means connected to said photoelectric means for producing a substantially exponentially increasing electric output dependent upon said flux; operating means for rapidly moving said shutter means from a withdrawn position to an illumination-blocking position; and electronic switch means connected to said circuit means for tripping said operating means in response to attainment of a predetermined maximum value by said electric output whereby said flux is substantially instantaneously cut off.

5. The combination defined in claim 4 wherein said diaphragm means comprises a pair of relatively movable juxtaposed members having cutouts disposed to register progressively with each other upon relative movement of said members from a normal position of noncoincidence to an extreme operating position of full coincidence of said cutouts, thereby defining a diaphragm aperture of progressively increasing area.

6. The combination defined in claim 5 wherein said drive means includes a source of stored energy bearing upon said element, cam means linking said element to said members, and releasable detent means normally blocking displacement of said members by said element, said detent means being coupled with said trigger means.

7. The combination defined in claim 6 wherein the coupling between said detent means and said trigger means includes a mechanical delay device, said circuit means including a normally open switch closable by said trigger means for connecting said photoelectric means to a current supply therefor prior to release of said detent means via said delay device.

8. The combination defined in claim 7 wherein said circuit means further includes a normally closed switch openable by said shutter means in said illumination-blocking position for de-energizing said photoelectric means independently of said trigger means.

9. The combination defined in claim 6 wherein said source of stored energy is a spring, said element having an inertance coupled therewith for substantially linearizing its displacement by said spring.

10. The combination defined in claim 9 wherein the coupling between said element and said inertance includes a motion-amplifying lever.

11. The combination defined in claim 5 wherein said cutouts have confronting obtuse angles defining a substantially rhombic aperture in a position of partial coincidence, said members being relatively movable along the shorter diagonal of the rhombus.

12. The combination defined in claim 11 wherein said obtuse angle is substantially 104°.

13. In a camera having an optical objective for projecting light from an external object onto a photosensitive surface, the combination therewith of light-control means in line with said objective for normally blocking illumination of said photosensitive surface; first photosensitive means disposed to receive reflected light rays from said photosensitive surface in an unblocking position of said light-control means; second photoelectric means disposed to receive a constant reference beam of ambient light independently of said diaphragm means; trigger means operable to move said light-control means into said unblocking position whereby a radiant flux is directed by said objective onto said photosensitive surface; circuit means differentially connected to said first and second photoelectric means for producing a progressively increasing electric output in response to said flux and said reference beam; operating means for rapidly restoring said light-control means to a blocking position; and electronic switch means connected to said circuit means for tripping said operating means in response to a predetermined magnitude of said electric output whereby said flux is substantially instantaneously cut off.

14. In a camera having an optical objective for projecting light from an external object onto a photosensitive surface, the combination therewith of continuously adjustable diaphragm means in line with said objective provided with an iris aperture of progressively variable size; normally inoperative mechanism for adjusting said diaphragm means with gradual enlargement of said iris aperture from a minimum to a maximum size, first photoelectric means disposed to receive reflected light rays from said photosensitive surface; second photoelectric means disposed to receive a constant reference beam of ambient light independently of said diaphragm means; normally withdrawn shutter means interposable between said objective and said photosensitive surface for blocking illumination of said photosensitive surface; trigger means operable to actuate said mechanism whereby a progressively increasing radiant flux is directed by said objective through said iris aperture onto said photosensitive surface; circuit means differentially connected to said first and second photoelectric means for producing an electric output dependent upon said flux and said reference beam; operating means for rapidly moving said shutter means from a withdrawn position to an illumination-blocking position; and electronic switch means connected to said circuit means for tripping said operating means in response to a predetermined magnitude of said electric output whereby said flux is substantially instantaneously cut off.

15. In a camera having an optical objective for projecting light from an external object onto a photosensitive surface, the combination therewith of continuously adjustable diaphragm means in line with said objective provided with an iris aperture of progressively variable size; normally inoperative mechanism for adjusting said diaphragm means with gradual enlargement of said iris aperture at a substantially exponential rate from a minimum to a maximum size, said mechanism including an actuating element and drive means for moving said element at a substantially constant speed; first photoelectric means disposed to receive reflected light rays from said photosensitive surface; second photoelectric means disposed to receive a constant reference beam of ambient light independently of said diaphragm means; normally withdrawn shutter means interposable between said objective and said photosensitive surface for blocking illumination of said photosensitive surface; trigger means operable to actuate said mechanism whereby a progressively increasing radiant flux is directed by said objective through said iris aperture onto said photosensitive surface; circuit means differentially connected to said first and second photoelectric means for producing a progressively increasing electric output dependent upon said flux and said reference beam; operating means for rapidly moving said shutter means from a withdrawn position to an illumination-blocking position; and electronic switch means connected to said circuit means for tripping said operating means in response to attainment of a predetermined maximum value by said electric output whereby said flux is substantially instantaneously cut off.

References Cited

UNITED STATES PATENTS 3,218,949   11/1965   Kiper _____ 95—10

FOREIGN PATENTS 903,528   8/1962   Great Britain.

NORTON ANSHER, *Primary Examiner.*

J. F. PETERS, *Assistant Examiner.*